(12) United States Patent
Wang et al.

(10) Patent No.: US 8,593,609 B2
(45) Date of Patent: *Nov. 26, 2013

(54) DISPLAY PANEL

(75) Inventors: Wen-Chun Wang, Taichung (TW);
Hsi-Rong Han, Taichung County (TW);
Yung-Cheng Chang, Taichung County (TW); Ming-Chang Yu, Taichung (TW);
Wan-Jen Tsai, Taichung County (TW);
Fa-Chen Wu, Yunlin County (TW)

(73) Assignee: Wintek Corporation, Taichung (TW)

( * ) Notice: Subject to any disclaimer, the term of this patent is extended or adjusted under 35 U.S.C. 154(b) by 468 days.

This patent is subject to a terminal disclaimer.

(21) Appl. No.: 12/980,347

(22) Filed: Dec. 29, 2010

(65) Prior Publication Data

US 2011/0157528 A1    Jun. 30, 2011

(30) Foreign Application Priority Data

Dec. 30, 2009  (TW) .............................. 98145803 A

(51) Int. Cl.
*G02F 1/1345* (2006.01)
*G02F 1/1335* (2006.01)
*H01L 31/036* (2006.01)

(52) U.S. Cl.
USPC ............................ 349/149; 349/106; 257/59

(58) Field of Classification Search
USPC ...................................... 349/111
See application file for complete search history.

(56) References Cited

U.S. PATENT DOCUMENTS

| 7,499,122 | B2 | 3/2009 | Lai et al. | |
| 7,599,014 | B2 | 10/2009 | Shih | |
| 8,263,981 | B2 * | 9/2012 | Wang et al. | 257/59 |
| 2003/0053022 | A1 * | 3/2003 | Kaneko et al. | 349/153 |
| 2010/0265445 | A1 * | 10/2010 | Wang et al. | 349/139 |

FOREIGN PATENT DOCUMENTS

TW   200734732   9/2007

* cited by examiner

*Primary Examiner* — Michelle R Connelly
(74) *Attorney, Agent, or Firm* — Jianq Chyun IP Office

(57) ABSTRACT

A display panel includes a first substrate, a conductive light-shielding pattern, color filter patterns, a second substrate, scan lines, data lines, pixel structures, third pads and fourth pads. The conductive light-shielding pattern disposed on the first substrate defines conductive matrix pattern, first pads, and second pads. Each first pad is electrically connected to one corresponding second pad through the conductive matrix pattern and insulated with other second pads. The color filter patterns are disposed on the first substrate and a portion of each color filter pattern overlaps the conductive light-shielding pattern. The third pads are one-to-one electrically to the first pads while the fourth pads are one-to-one electrically connected to the second pads. Each fourth pad is electrically connected to one of the scan lines and one of the data lines.

16 Claims, 7 Drawing Sheets

DISPLAY PANEL

CROSS-REFERENCE TO RELATED APPLICATION

This application claims the priority benefit of Taiwan application serial no. 98145803, filed on Dec. 30, 2009. The entirety of the above-mentioned patent application is hereby incorporated by reference herein and made a part of specification.

BACKGROUND OF THE INVENTION

1. Field of the Invention

The invention is related to a display panel and particular to a display panel having high aperture ratio and slim border by transmitting signals through the light-shielding pattern in the color filter.

2. Description of Related Art

FIG. 1 is a schematic top view of a conventional display panel. Referring to FIG. 1, the display panel 100 includes an array substrate 102 and a color filter substrate 104 stacked thereon. The array substrate 102 are configured with a plurality of scan lines 106 and a plurality of data lines (not shown) perpendicular to the scan lines 106. The scan lines 106 and the non-shown data lines are intersected disposed to define a display region AA. Each scan line 106 is conducted to a driving circuit 110 through a wire 108 to receive a scan signal from the driving circuit 110.

The display panel 100 can be designed based on the resolution of wide video graphic array (WVGA) standard so that the resolution of the display panel 100 is, for example, 800× 480. Generally, the wires 108 are disposed at two opposite sides of the display panel 100, i.e. 240 lines of wires 108 are disposed at one side. It is assumed that the line width of each wire 108 is 3 µm and the pitch between two adjacent wires 108 is 3 µm. The total width for disposing 240 lines of wires 108 is about 1.437 mm. Accordingly, the border width W of the display panel 100 is at least 1.5 mm. In other words, a space of at least 3 mm wide are needed at the sides of the display region AA in the display panel 100 for disposing the wires 108 and other wirings.

SUMMARY OF THE INVENTION

The invention is directed to a display panel having high aperture ratio and slim border by using the light-shielding pattern to transmit signals.

The invention provides a display panel having a display region and a non-display region outside the display region. The display panel includes a first substrate, a conductive light-shielding pattern, a plurality of color filter patterns, a second substrate, a plurality of scan lines, a plurality of data lines, a plurality of pixel structures, a plurality of third pads, and a plurality of fourth pads. The conductive light-shielding pattern disposed on the first substrate defines conductive matrix pattern, first pads, and second pads. The conductive matrix pattern demarcates a plurality of pixel areas in the display region, and the first pads and the second pads are disposed located in the non-display region. Each first pad is electrically connected to one corresponding second pad through the conductive matrix pattern and insulated with other second pads. The color filter patterns are disposed on the first substrate and located inside the display region, wherein a portion of each color filter pattern overlaps the conductive light-shielding pattern. The scan lines and the data lines are disposed on the second substrate and the scan lines are intersected to the data lines. The pixel structures are disposed on the second substrate and respectively located in the corresponding pixel areas. Each of the pixel structures are electrically connected to one of the scan lines and one of the data lines. The third pads and the fourth pads are disposed on the second substrate and located in the non-display region. The third pads are one-to-one electrically connected to the first pads, the fourth pads are one-to-one electrically connected to the second pads, and each fourth pad is directly connected to one scan line or one data line.

In view of the above, the display panel of the invention is configured with the conductive light-shielding pattern in the color filter to transmit the required signals of the scan line or the data lines. The conductive light-shielding pattern is disposed in the display region so that the display panel of the invention has slim border. In addition, the conductive light-shielding pattern is already configured to provide light-shielding effect in the conventional design, and thus the aperture ratio of the pixel structure is not negatively influenced. Namely, the display panel of the invention achieves the slim border design under the maintenance of high aperture ratio.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
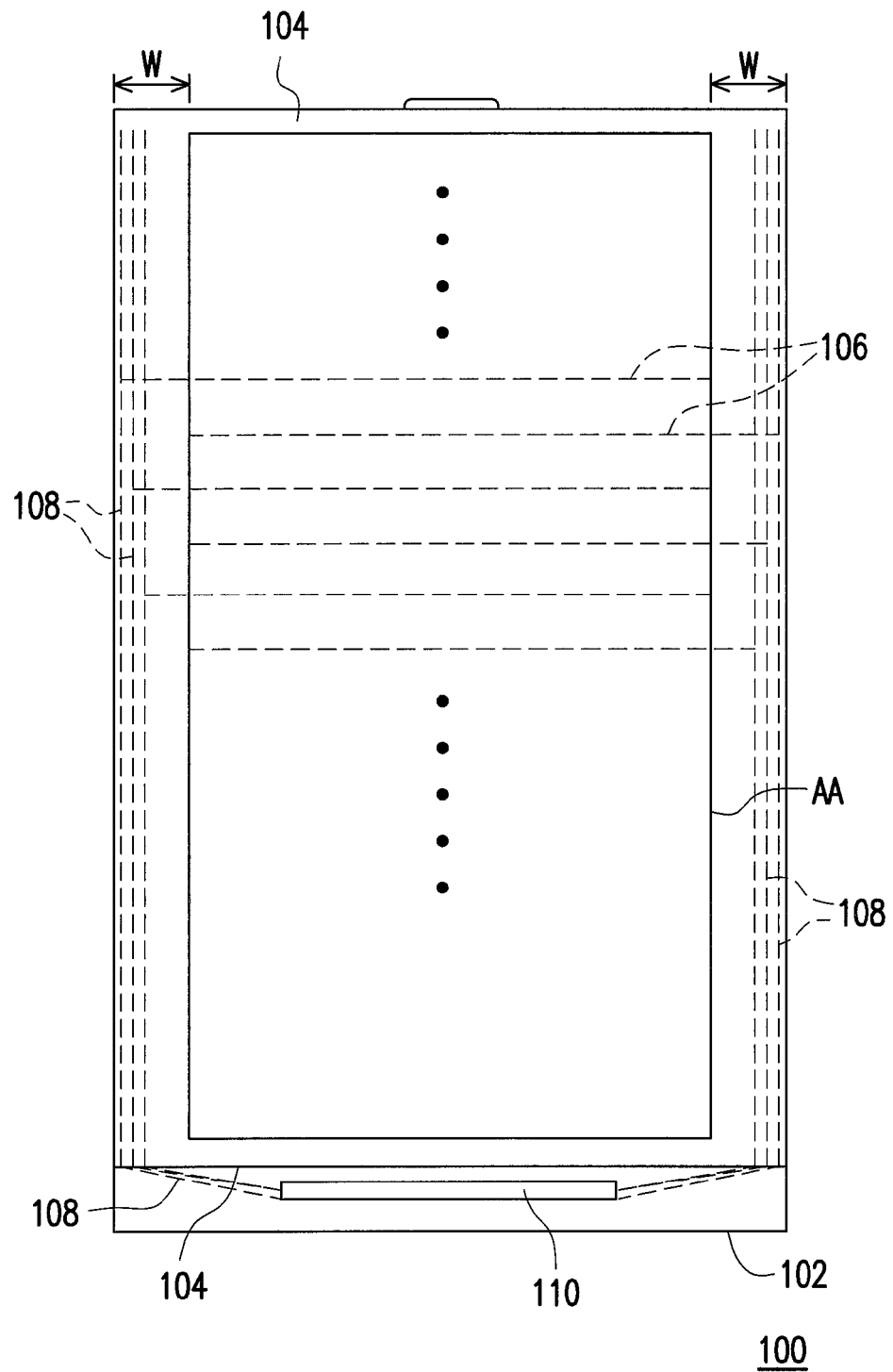
FIG. 1 is a schematic top view of a conventional display panel.
Figure 2:
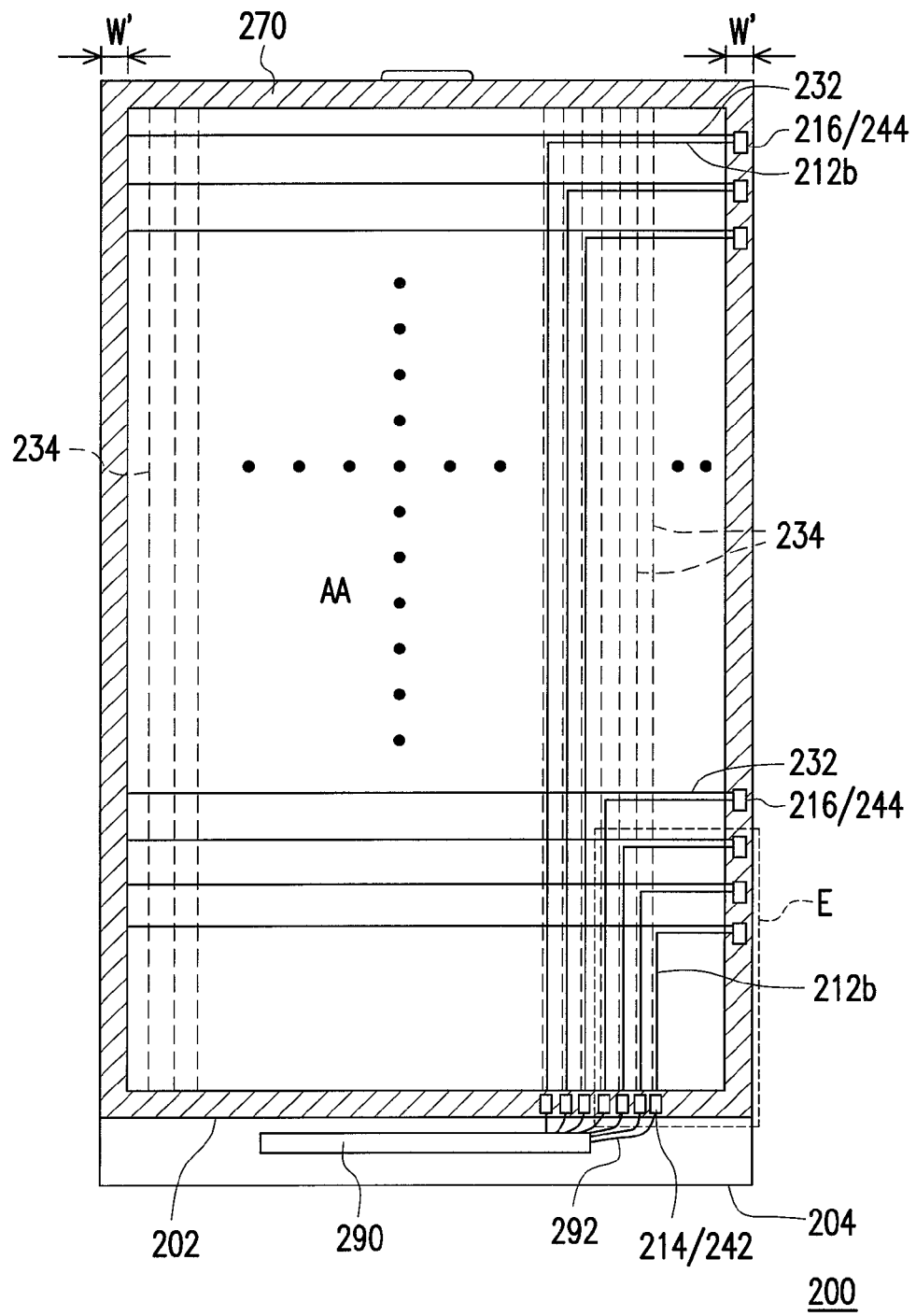
FIG. 2 is a schematic top view of a display panel according to an embodiment of the invention.
Figure 3:
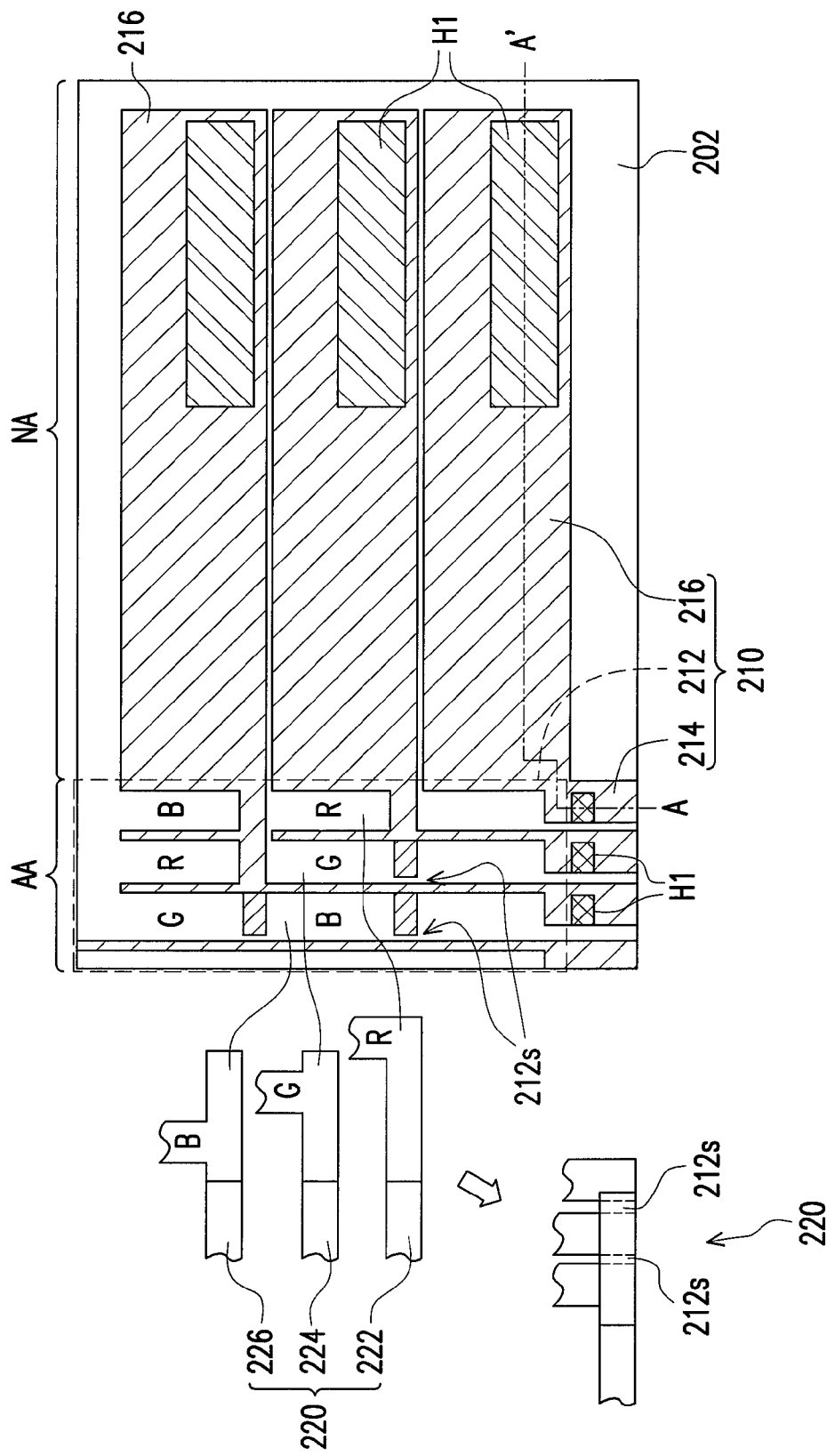
FIG. 3 and FIG. 4 are respectively partial enlarged views of the color filter substrate and the array substrate of the display panel in FIG. 2, wherein the enlarged portion is corresponding to the region E marked in FIG. 2 and merely a portion of the elements are shown in the enlarged views.
Figure 4:
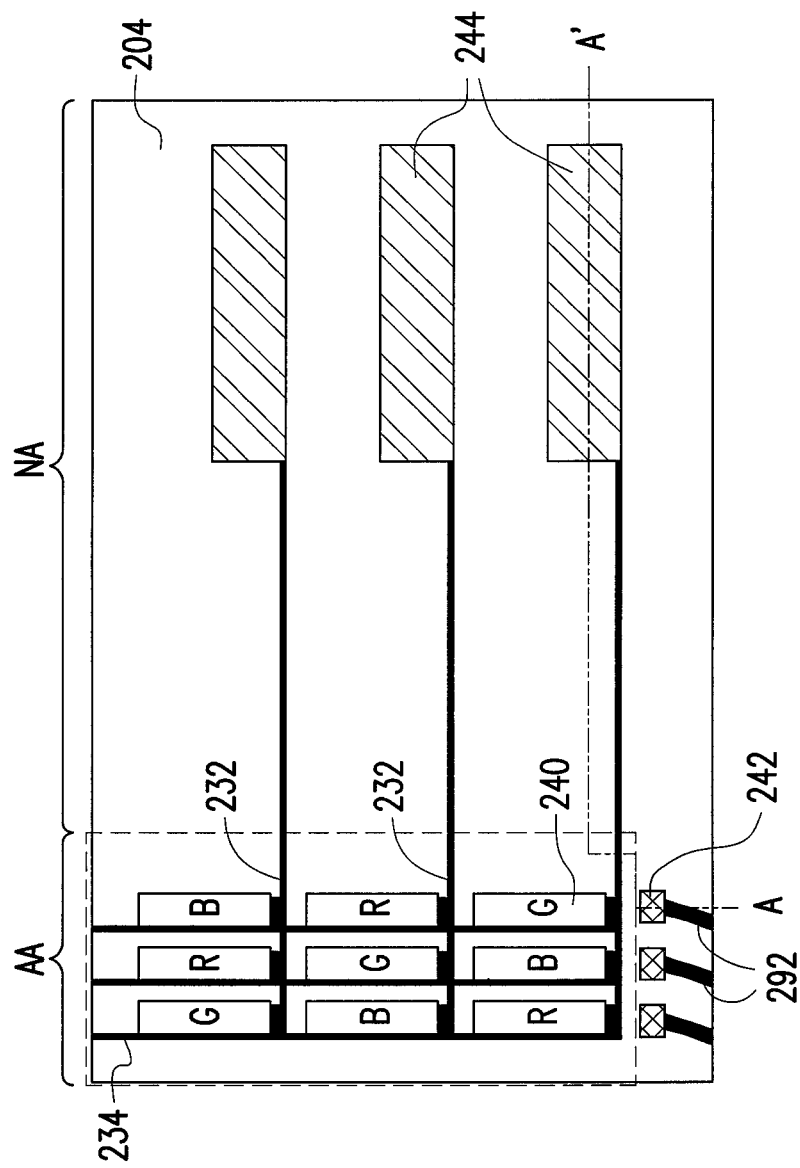
Figure 5:
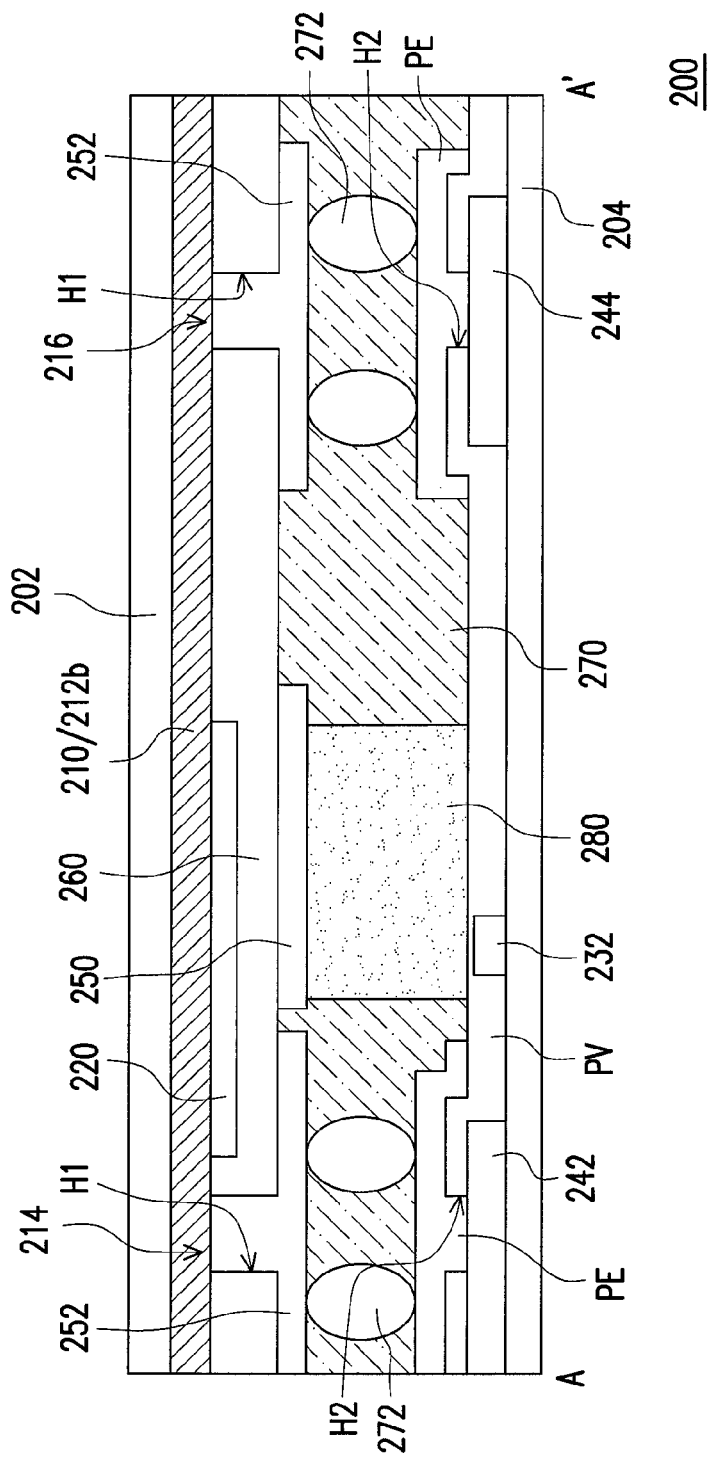
FIG. 5 is a schematic cross sectional view of the display panel in FIG. 2, wherein the cross sectional view is taken along the lines A-A' marked in FIGS. 3 and 4.

FIG. 2 is a schematic top view of a display panel according to an embodiment of the invention. FIG. 3 and FIG. 4 are partial enlarged views of the color filter substrate and the array substrate of the display panel in FIG. 2, wherein the enlarged portion is corresponding to the region E marked in FIG. 2 and merely a portion of the elements are shown in the enlarged views. FIG. 5 is a schematic cross sectional view of the display panel in FIG. 2, wherein the cross sectional view is taken along the lines A-A' marked in FIGS. 3 and 4.

Referring to FIGS. 2, 3, and 4, the display panel 200 has a display region AA and a non-display region NA outside the display region AA. The display panel 200 mainly includes a first substrate 202, a second substrate 204, and the elements disposed on the two substrates. For instance, the first substrate 202 is disposed with a conductive light-shielding pattern 210 and a plurality of color filter patterns 220 to form the color filter substrate shown in FIG. 3. The second substrate 204 is disposed with a plurality of scan lines 232, a plurality of data lines 234, a plurality of pixel structures 240, a plurality of third pads 242, and a plurality of fourth pads 244 to form the array substrate shown in FIG. 4.

The conductive light-shielding pattern 210 defines a conductive matrix pattern 212, a plurality of first pads 214, and a plurality of second pads 216. The conductive matrix pattern 212 demarcates a plurality of pixel areas R, G, B in the display region AA, and the first pads 214 and the second pads 216 are located in the non-display region NA. On the other hand, the scan lines 232 and the data lines 234 are disposed intersected with one another, and each of the pixel structures 240 is electrically connected to one scan line 232 and one data line 234. The third pads 242 and the fourth pads 244 are located in the non-display region NA, and each fourth pad 244 in the present embodiment is directly connected to one scan line 232. In other embodiments, when the extending directions of the scan lines 232 and the data lines 234 are altered, each fourth pads 244 can be directly connected to one data line 234. Accordingly, the invention is not restricted thereto.

For driving the pixel structures 240, the display panel 200 on the present embodiment has a driving circuit 290 as shown in FIG. 2, which is disposed on the second substrate 204. In addition, the driving circuit 290 is used to transmit a signal to the third pads 242.

When the color filter substrate and the array substrate are assembled to form the display panel 200, a plurality of pixel structures 240 are respectively located in the corresponding pixel areas R, G, and B, and the conductive matrix pattern 212 is configured corresponding to the location where the scan lines 232 and the data line 234 are located. Moreover, the third pads 242 and the first pads 214 are faced to each other and the fourth pads 244 and the second pads 216 are faced to each other.

Specifically, a material of the conductive light-shielding pattern 210 in the present embodiment can be a metal, a metal oxide, a metal nitride, or other conductive materials having light-shielding property. That is to say, the conductive light-shielding pattern 210 has electric conductivity to transmit signals. In the present embodiment, the conductive matrix pattern 212 has a plurality of gaps 212s. Accordingly, each first pad 214 is electrically connected to one corresponding second pad 216 through the conductive matrix pattern 212 and insulated with other second pads 216 so as to define a plurality of signal transmitting paths 212b. It is noted that the signal transmitting paths 212b are separated from each other to transmit individual signals.

Moreover, the third pads 242 and the first pads 214 are faced to each other and the fourth pads 244 and the second pads 216 are faced to each other. Therefore, if the third pads 242 and the first pads 214 are electrically connected and the fourth pads 244 and the second pads 216 are electrically connected, the signal provided by the driving circuit 290 is transmitted to the corresponding scan line 232 through the wire 292, the corresponding third pad 242, the corresponding first pad 214, the corresponding transmitting path 212b, the corresponding second pad 216, and the corresponding fourth pad 244 sequentially. In other words, the design of the present embodiment makes the signal be substantially transmitted in the display region AA and the signal transmitting wires disposed at two opposite sides of the display region AA are not required to facilitate the requirement of slim border.

In addition, in the present embodiment, the color filter patterns 220 includes a plurality of first patterns 222, a plurality of second patterns 224, and a plurality of third patterns 226. The first patterns 222, the second patterns 224, and the third patterns 226 are respectively made of a red color filter material, a green color filter material, and a blue color filter material so as to be disposed in the corresponding pixel areas R, G, and B. In the design of the patterns, the shape of the first patterns 222 is exemplified as an L-like shape, and the second patterns 224 and the third patterns 226 are shaped in a T shape or a T-like shape. Accordingly, a portion of each color filter pattern 220 covers the conductive matrix pattern 212 of the conductive light-shielding pattern 210. Moreover, the gaps 212s of the conductive matrix pattern 212 are cover simultaneously by the first patterns 222, the second patterns 224, and the third patterns 226 with different colors. Therefore, the light leakage at the gaps 212s is efficiently obstructed in the display panel 200. Nevertheless, the embodiment illustrated in FIG. 3 is used as an example, and the invention is not restricted in the arrangements of red color filter patterns, green color filter patterns, and blue color filter patterns of the color filter patterns 220.

Referring to FIG. 5, the display panel 200 further includes a common electrode 250 disposed on the color filter patterns 220 away from the first substrate 202 and located in the display region AA. Furthermore, the display panel 200 further includes display medium 280 sandwiched between the first substrate 202 and the second substrate 204. The display medium 280 can be a liquid crystal material, an electrophoretic material, or an organic luminescent material. In other words, the display panel 200 according to the present embodiment can be a liquid crystal display (LCD) panel, an electrophoresis display (EPD) panel, or an organic light emitting display (OLED) panel. In other embodiments, the display panel 200 can also be an electrowetting display (EWD) panel or other suitable display panels, and the invention is not restricted herein.

In the present embodiment, the display panel 200 further includes a protective layer 260 disposed between the common electrode 250 and the conductive light-shielding pattern 210 to prevent from a short circuit therebetween. As shown in FIG. 5, the protective layer 260 can be located between the color filter patterns 220 and the common electrode 250 and a material of the protective layer 260 can be silicon oxide, silicon nitride, or an organic material. Nevertheless, the disposition locations of the color filter patterns 220 and the protective layer 260 are not limited in the invention. For example, in other embodiment, the protective layer 260 can be formed on the conductive light-shielding layer 210 prior to the color filter patterns 220 and then the color filter patterns 220 are formed on the protective layer 260 so that the high temperature applied for manufacturing the protective layer 260 is prevented from damaging the color filter patterns 220 to enhancing the reliability of the manufacturing process.

Furthermore, the protective layer 260 has a plurality of contacting openings H1 to expose the first pads 214 and the second pads 216. The display panel 200 further has a plurality of transparent pads 252 disposed on the protective layer 260. The transparent pads 252 are located in the non-display region NA and filled in the contacting openings H1 so as to electrically connect the first pads 214 and the second pads 216 correspondingly. The transparent pads 252 and the common electrode 250 are, for example, made by the same film layer, i.e. the transparent pads 252 and the common electrode 250 are formed in the same manufacturing process. In particular, the transparent pads 252 and the common electrode 250 can be fabricated by using a transparent conductive material, such as indium-tin oxide (ITO) or indium-zinc oxide (IZO).

In addition, the second substrate 204 is exemplified configured with another protective layer PV to protect the conductive elements such as the scan lines 232 disposed on the second substrate 204. The protective layer PV has a plurality of contacting openings H2 to expose the third pads 242 and the fourth pads 244. Moreover, the display panel 200 in the present embodiment has a plurality of transparent pads PE disposed on the protective layer PV on the second substrate 204 and filled in the contacting openings H2. Specifically, the transparent pads PE and the pixel electrodes (not shown) of the pixel structures 240 are formed by the same film layer and can be simultaneously fabricated on the protective layer PV.

The display panel 200 further includes a sealant 270 configured in the non-display region NA to adhere the first substrate 202 and the second substrate 204 to each other. The sealant 270 has a plurality of conductive particles 272 and the conductive particles 272 are exemplified as Au balls. Therefore, the third pads 242 can be electrically connected to the first pads 214 through the conductive particles 272 and the fourth pads 244 can be electrically connected to the second pads 216 through the conductive particles 272. Accordingly, the signals provided by the driving circuit 290 illustrated in FIG. 2 can be transmitted to the corresponding scan line 232 through the wire 292, the corresponding third pad 242, the corresponding first pad 214, the corresponding transmitting path 212b, the corresponding second pad 216, and the corresponding fourth pad 244 sequentially. It is noted that the term "corresponding" elements used in the context means that the elements are connected electrically connected, physically connected, or the location thereof is overlapped after the display panel 200 is assembled, and a person who has ordinary skill in the art commonly knows that the so-called corresponding elements are descriptive and clearly explicated in the drawings provided herein.

Additionally, when the material of the protective layer 260 on the first substrate 202 is an organic material, the protective layer 260 covering on the color filter patterns 220 provides desirable planarization effect and the contacting openings H1 in the protective layer 260 can be formed by the photolithographic process. Under this circumstance, the depth of the contacting openings H1 are required to be properly controlled and the residue of the organic material in the contacting openings H1 may need to be prevented to facilitate the conductive particles 272 simultaneously contacting the transparent pads 252 on the first substrate 202 and the transparent pads PE on the second substrate 204. In addition, the organic material used to form the protective layer 260 can be selected according to the adhesion property between the protective layer 260 and the transparent pads 252.

The display panel 200 of the present embodiment is configured with the conductive light-shielding pattern 210 to transmit signals, and the signal transmission between the driving circuit 290 and the scan lines 232 is performed in the display region AA so that the required area of the non-display region NA in the display panel 200 is much reduced. That is to say, the border width W' of the display panel 200 is significant reduced relative to the border width W of the display panel 100 under the same size and resolution design so as to accomplish the slim border property. Moreover, the conductive matrix pattern 212 is original configured as light-shielding elements in the conventional technique so that the aperture ratio of the display panel 200 is not negatively influenced by the disposition of the conductive matrix pattern 212. More specifically, the color filter patterns 220 of the display panel 200 in the present embodiment are designed in specific shapes to prevent the light leakage caused in the gaps 212s so that the display panel 200 has enhanced display quality.

Figure 6:
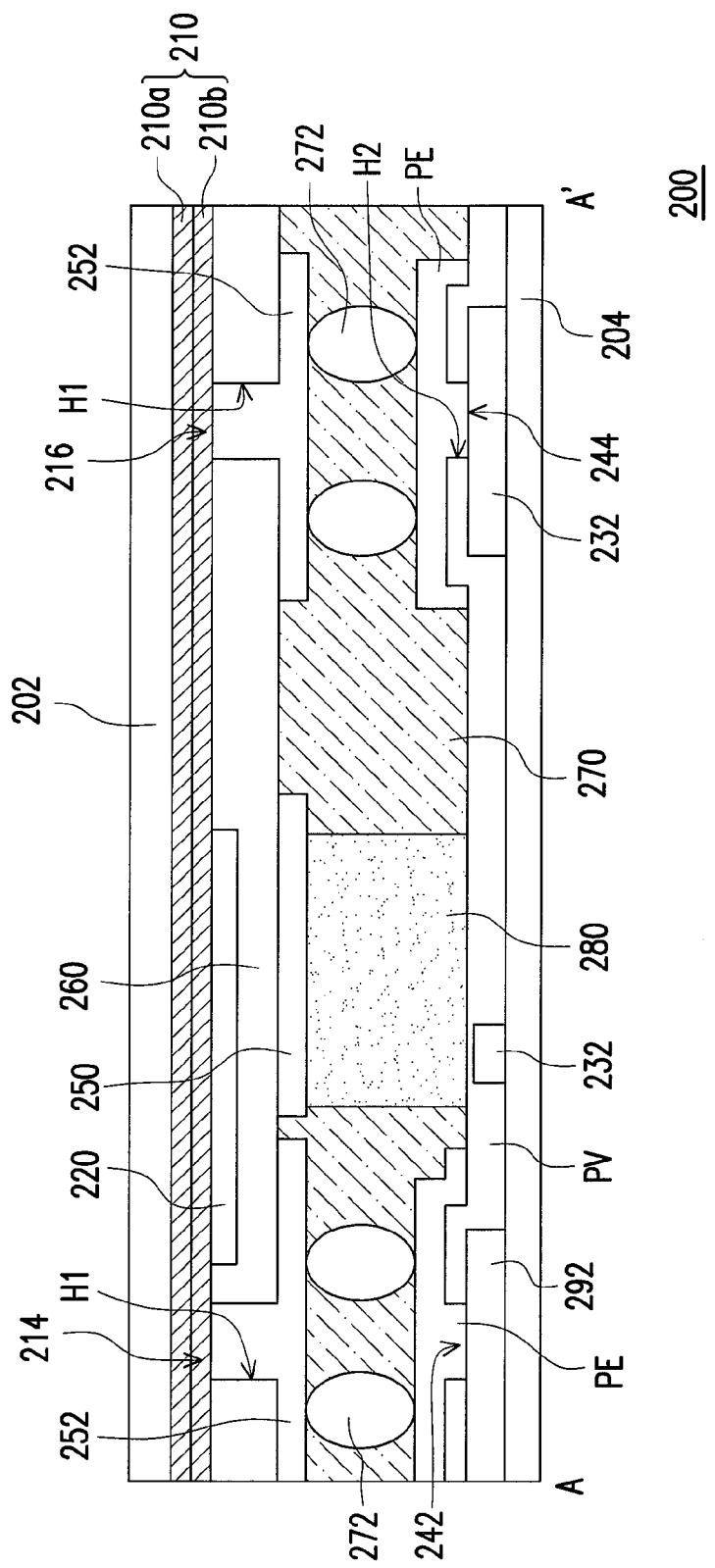
FIG. 6 is a schematic cross-sectional view of a display panel according to another embodiment of the invention.

FIG. 6 is a schematic cross-sectional view of a display panel according to another embodiment of the invention. Referring to FIG. 6, the conductive light-shielding pattern 210 can be formed by the stacking of the light-shielding layer 210a and the conductive layer 210b in the invention so as to reduce the transmission impedance of the conductive light-shielding pattern 210. In the embodiment illustrated in FIG. 6, the light-shielding layer 210a is disposed on the first substrate 202 and the conductive layer 210b is disposed on the light-shielding layer 210a. A material of the light-shielding layer 210a can be a metal oxide or black resin, and a material of the conductive layer 210b can be a metal. In certain embodiments, the light-shielding layer 210a and the conductive layer 210b can be fabricated by performing the same process such as the chemical vapor deposition (CVD) process or the physical vapor deposition (PVD) process multi times to be formed on the first substrate 202. It is noted that the third pads 242 may be a portion of the wire 292 as shown in FIG. 6, wherein the portion of the wires 292 exposed by the protective layer PV may be defined as the third pads 242. In the aforesaid embodiment, the third pads 242 and the wires 292 can similarly be formed by the same conductive pattern.

Figure 7:
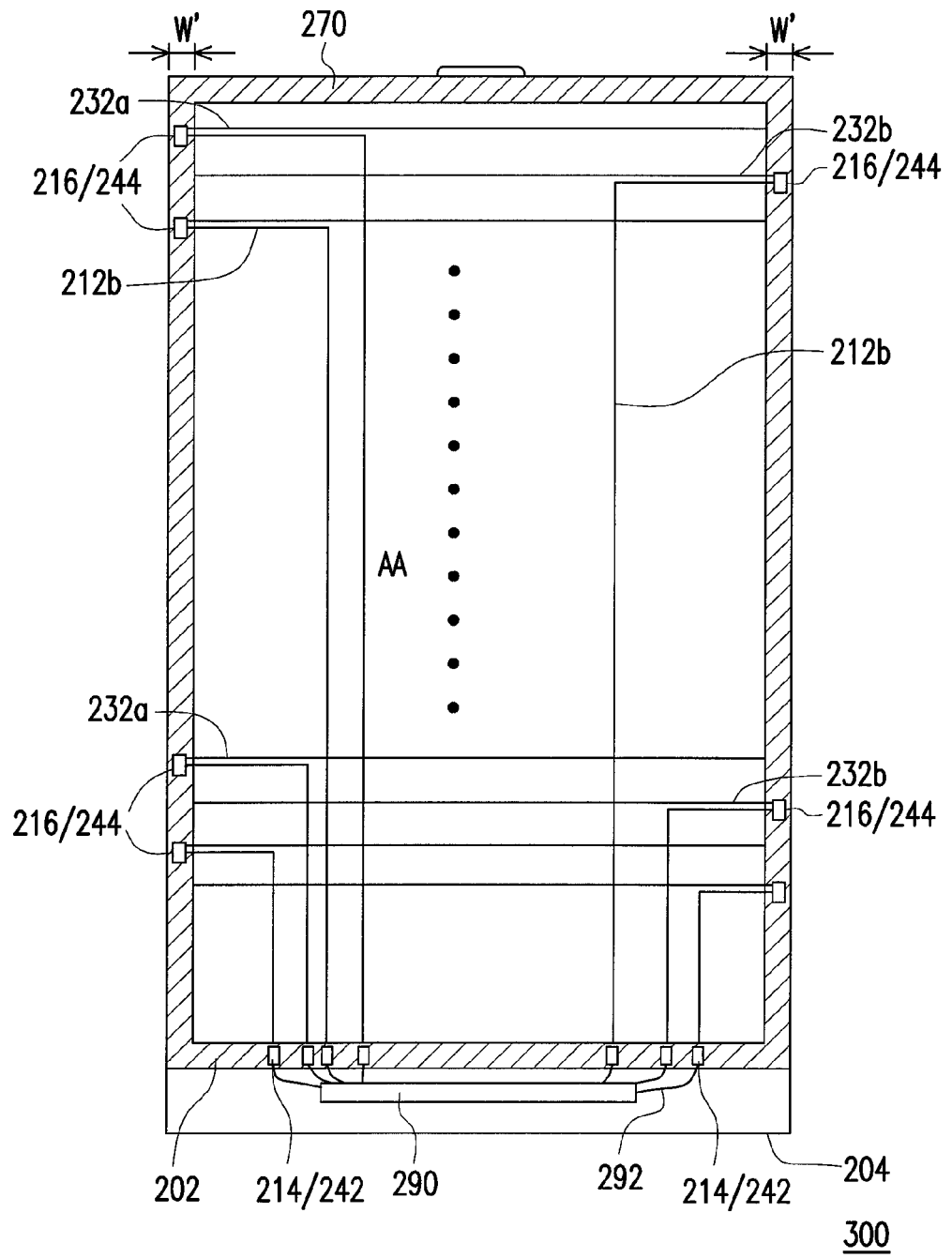
FIG. 7 is a schematic top view of a display panel according to further another embodiment of the invention.

FIG. 7 is a schematic top view of a display panel according to further another embodiment of the invention. Referring to FIG. 7, the display panel 300 and the display panel 200 are mainly constructed by the same elements marked in the same reference number. Accordingly, these elements are not duplicated described.

Specifically, the difference between the display panel 300 and the display panel 200 mainly lies in that the second pads 216 and the fourth pads 244 in the display panel 300 are disposed at two opposite sides of the display panel 300 and the fourth pads 244 are also disposed at two opposite sides of the display panel 300. As shown in the embodiment depicted in FIG. 7, some fourth pads 244 disposed at the left side of the display panel 300 are electrically connected to the odd scan lines 232a, e.g. the first, the third, the fifth . . . the $(2N+1)^{th}$ scan line, wherein N is a positive integer. Similarly, the other fourth pads 244 disposed at the right side of the display panel 300 are electrically connected to the even scan lines 232b, e.g. the second, the fourth, the sixth . . . the $(2N)^{th}$ scan line, wherein N is a positive integer.

The design of the display panel 300 is conducive to vary the wiring layout of the panel and apt to be applied in large size panels. In addition, the display panel 300 has the elements configured in the display panel 200 so that the display panel 300 can achieve the objectives and the technical effects the display panel 200 achieves.

In summary, the display panel of the invention is configured with the conductive light-shielding pattern disposed on the color filter substrate to transmit signals in the display region so as to achieve a slim border. The conductive light-shielding pattern is original configured for shielding light so that the aperture ratio of the pixel structure is not negatively influenced. Accordingly, the display panel of the invention maintains high aperture ratio and has slim border. Moreover, the color filter patterns of the display panel in the invention are designed in specific shapes to prevent the light leakage caused in the gaps of the conductive light-shielding pattern so that the display panel has enhanced display quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display panel, having a display area and a non-display area located outside the display area, comprising:

a first substrate;

a conductive light-shielding pattern disposed on the first substrate and the conductive light-shielding pattern defining a conductive matrix pattern, a plurality of first pads, and a plurality of second pads, the conductive matrix pattern demarcating a plurality of pixel areas in the display region, the first pads and the second pads being located in the non-display region, wherein each of the first pads is electrically connected to one corresponding second pad through the conductive matrix pattern and is electrically insulated from other second pads;

a second substrate;

a plurality of scan lines and a plurality of data lines disposed on the second substrate, wherein the scan lines intersect to the data lines;

a plurality of pixel structures disposed on the second substrate and respectively located in the corresponding pixel areas, each of the pixel structures being electrically connected to one of the scan lines and one of the data lines; and a plurality of third pads and a plurality of fourth pads disposed on the second substrate and located in the non-display region, the third pads being one-to-one electrically connected to the first pads, the fourth pads being one-to-one electrically connected to the second pads, and each of the fourth pads directly connected to one of the scan lines or one of the data lines.

2. The display panel as claimed in claim 1, further comprising a sealant disposed in the non-display region to adhere the first substrate and the second substrate.

3. The display panel as claimed in claim 2, wherein the sealant has a plurality of conductive particles, the third pads are electrically connected to the first pads through the conductive particles, and the fourth pads are electrically connected to the second pads through the conductive particles.

4. The display panel as claimed in claim 1, further comprising a display medium disposed between the first substrate and the second substrate.

5. The display panel as claimed in claim 4, wherein the display medium comprises a liquid crystal, an electrophoretic material, or an organic electro-luminescent material.

6. The display panel as claimed in claim 1, further comprising a plurality of color filter patterns disposed on the first substrate and located inside the display region, wherein a portion of each color filter pattern overlaps the conductive light-shielding pattern.

7. The display panel as claimed in claim 6, wherein the conductive matrix pattern has a plurality of gaps so that each of the first pads are electrically connected to one corresponding second pad through the conductive matrix pattern, and is electrically insulated from other second pads.

8. The display panel as claimed in claim 7, wherein the color filter patterns comprises a plurality of first patterns, a plurality of second patterns, and a plurality of third patterns, and the gaps are covered by one first pattern, one second pattern, and one third pattern.

9. The display panel as claimed in claim 8, wherein shapes of the first patterns, the second patterns, or the third patterns comprises a T-like shape or an L-like shape.

10. The display panel as claimed in claim 6, further comprising a common electrode disposed on the color filter patterns away from the first substrate.

11. The display panel as claimed in claim 10, further comprising a passivation layer disposed between the common electrode and the conductive light-shielding pattern.

12. The display panel as claimed in claim 11, wherein a material of the passivation layer comprises silicon oxide, silicon nitride, or an organic material.

13. The display panel as claimed in claim 11, wherein the passivation layer has a plurality of contacting openings exposing the first pads and the second pads.

14. The display panel as claimed in claim 13, further comprising a plurality of transparent pads disposed on the passivation layer, located in the non-display region, and filled in the contacting openings, wherein the transparent pads are electrically connected to the first pads and the second pads correspondingly.

15. The display panel as claimed in claim 1, wherein a material of the conductive light-shielding pattern comprises a metal, a metal oxide, or a metal nitride.

16. The display panel as claimed in claim 1, wherein the conductive light-shielding pattern comprises:

a light-shielding layer disposed on the first substrate; and a conductive layer disposed on the light-shielding layer.

\* \* \* \* \*